US010523901B2

(12) United States Patent
DeKeyser

(10) Patent No.: US 10,523,901 B2
(45) Date of Patent: Dec. 31, 2019

(54) WEARABLE RECORDING SYSTEM WITH MEMORY DESIGNATION

(71) Applicant: STELLAR, LLC, Irvine, CA (US)

(72) Inventor: Paul DeKeyser, Irvine, CA (US)

(73) Assignee: Paul DeKeyser, Irvine, CA (US)

( * ) Notice: Subject to any disclaimer, the term of this patent is extended or adjusted under 35 U.S.C. 154(b) by 0 days.

(21) Appl. No.: 15/875,828

(22) Filed: Jan. 19, 2018

(65) Prior Publication Data

US 2018/0146163 A1    May 24, 2018

Related U.S. Application Data

(63) Continuation of application No. 15/279,155, filed on Sep. 28, 2016, now Pat. No. 9,912,914, which is a
(Continued)

(51) Int. Cl.
| | |
|---|---|
| *H04N 7/18* | (2006.01) |
| *H04N 5/77* | (2006.01) |
| *G11B 23/28* | (2006.01) |
| *G11B 27/10* | (2006.01) |
| *G11B 31/00* | (2006.01) |

(Continued)

(52) U.S. Cl.
CPC ............ *H04N 7/18* (2013.01); *G11B 23/288* (2013.01); *G11B 27/10* (2013.01); *G11B 31/006* (2013.01); *H04N 5/76* (2013.01); *H04N 5/77* (2013.01); *G08B 13/19621* (2013.01); *G08B 13/19676* (2013.01); *G08B 15/001* (2013.01); *G11B 2220/216* (2013.01)

(58) Field of Classification Search
CPC .. H04N 7/18; H04N 5/76; H04N 5/77; H04N 5/23206; H04N 1/00127; G11B 23/288; G11B 27/10; G11B 31/006; G08B 13/19621; G08B 13/19676; G08B 15/001; G08B 2220/216
See application file for complete search history.

(56) References Cited

U.S. PATENT DOCUMENTS

| | | | |
|---|---|---|---|
| 5,204,909 A | 4/1993 | Cowan | |
| 5,381,526 A | 1/1995 | Ellson | |
| (Continued) | | | |

FOREIGN PATENT DOCUMENTS

| | | |
|---|---|---|
| EP | 0510968 | 10/1992 |
| EP | 1064783 | 4/2003 |
| (Continued) | | |

OTHER PUBLICATIONS

Axis 2100 Network Camera User Guide R2.0; 68 pages; Nov. 2001.

*Primary Examiner* — Christopher Braniff
(74) *Attorney, Agent, or Firm* — Fish IP Law, LLP

(57) ABSTRACT

A surveillance apparatus continuously records imaged data from a camera into a circular buffer in a local memory. When a record signal is received, the system records the video stream that was recorded before the record signal was received, and the video stream that is recorded after the record signal was received. The recorded segment is then write-protected, so that the surveillance apparatus does not overwrite the recorded segment. The recorded segment could then be sent to a remote memory via a wireless connection to free up local memory for future recording sessions.

25 Claims, 4 Drawing Sheets

Related U.S. Application Data continuation of application No. 13/790,553, filed on Mar. 8, 2013, now Pat. No. 9,485,471, which is a continuation of application No. 12/560,584, filed on Sep. 16, 2009, now Pat. No. 8,692,882, which is a continuation-in-part of application No. 12/268,286, filed on Nov. 10, 2008, now Pat. No. 7,593,034, which is a continuation-in-part of application No. 11/770,920, filed on Jun. 29, 2007, now Pat. No. 8,310,540, said application No. 12/268,286 is a continuation-in-part of application No. 11/846,217, filed on Aug. 28, 2007, now Pat. No. 8,928,752.

(60) Provisional application No. 60/824,095, filed on Aug. 31, 2006.

(51) Int. Cl.
*H04N 5/76* (2006.01)
*G08B 15/00* (2006.01)
*G08B 13/196* (2006.01)

(56) References Cited

U.S. PATENT DOCUMENTS

| | | | |
|---|---|---|---|
| 5,418,529 A | 5/1995 | De Luigi et al. | |
| 5,523,799 A | 6/1996 | Hattori et al. | |
| 5,689,442 A | 11/1997 | Swanson et al. | |
| 5,790,427 A | 8/1998 | Greer et al. | |
| 6,163,338 A | 12/2000 | Johnson et al. | |
| 6,307,526 B1* | 10/2001 | Mann | G02B 27/017 345/7 |
| 6,317,817 B1 | 11/2001 | Shichiku et al. | |
| 6,351,798 B1 | 2/2002 | Aono | |
| 6,370,198 B1 | 4/2002 | Washino | |
| 6,389,340 B1* | 5/2002 | Rayner | B60R 1/00 340/438 |
| 6,617,963 B1* | 9/2003 | Watters | G01D 5/48 340/10.41 |
| 6,618,546 B2 | 9/2003 | Ichioka et al. | |
| 6,831,652 B1 | 12/2004 | Orr | |
| 6,950,600 B2 | 9/2005 | Dietz | |
| 7,162,607 B2 | 1/2007 | Macy et al. | |
| 7,195,164 B2 | 3/2007 | Patel | |
| 7,263,073 B2 | 8/2007 | Petite et al. | |
| 7,373,395 B2* | 5/2008 | Brailean | H04L 29/06027 709/204 |
| 7,546,602 B2 | 6/2009 | Heilsberg | |
| 7,587,323 B2 | 9/2009 | Matz et al. | |
| 7,813,822 B1 | 10/2010 | Hoffberg | |
| 2002/0005895 A1 | 1/2002 | Freeman et al. | |
| 2004/0183912 A1 | 9/2004 | Szolyga et al. | |
| 2005/0240942 A1 | 10/2005 | Smith | |
| 2006/0158968 A1 | 7/2006 | Vanman et al. | |
| 2007/0132773 A1 | 6/2007 | Plante | |
| 2007/0150138 A1* | 6/2007 | Plante | H04N 21/23406 701/33.4 |
| 2007/0174538 A1 | 7/2007 | Christoffersson et al. | |
| 2008/0177994 A1 | 7/2008 | Mayer | |
| 2012/0078555 A1* | 3/2012 | Banhegyesi | G01D 4/004 702/64 |

FOREIGN PATENT DOCUMENTS

| | | |
|---|---|---|
| WO | 92/22983 | 12/1992 |
| WO | 99/49656 | 9/1999 |
| WO | 99/56216 | 11/1999 |
| WO | 2006/044476 | 4/2006 |

* cited by examiner

WEARABLE RECORDING SYSTEM WITH MEMORY DESIGNATION

This application is a continuation of U.S. patent application Ser. No. 15/279,155 filed on Sep. 28, 2016 (pending), which is a continuation of U.S. patent application Ser. No. 13/790,553 filed on Mar. 8, 2016 (now issued as U.S. Pat. No. 9,485,471), which is a continuation of U.S. patent application Ser. No. 12/560,584, filed Sep. 16, 2009 (now issued as U.S. Pat. No. 8,692,882), which is a continuation of U.S. patent application Ser. No. 12/268,286, filed Nov. 10, 2008 (now issued as U.S. Pat. No. 7,593,034) which is a continuation-in-part of U.S. patent application Ser. No. 11/770,920, filed Jun. 29, 2007 (now issued U.S. Pat. No. 8,310,540), which claims the benefit of U.S. provisional patent 60/824,097, filed Aug. 31, 2006. This application and Ser. No. 12/268,286 are also continuations-in-part of U.S. patent application Ser. No. 11/846,217, filed Aug. 28, 2007, which claims the benefit of U.S. provisional patent 60/824,095, filed Aug. 31, 2006. These and all other referenced extrinsic materials are incorporated herein by reference in their entirety. Where a definition or use of a term in an incorporated reference is inconsistent or contrary to the definition of that term provided herein, the definition of that term provided herein applies and the definition of that term in the reference does not apply.

I. FIELD OF THE INVENTION

The field of the invention is video camera recording technology.

II. BACKGROUND

Conventional camcorders use a variety of storage formats including digital video cassettes, mini-DV cassettes, or DVD-R discs that offer a limited amount of memory to store data. One of the major shortcomings of the existing camcorder technology is that the memory runs out too soon. Once a portion of the memory has been recorded, there is less memory available for further recording. Then when the memory is full, users have to return to their home/work computer or media station to transfer the recorded data from the camera to free up the memory. This creates inconvenience and inflexibility for recording on the go.

WO 2006/044476 to Vanman describes an electronic camera mounted to a police vehicle with a circular buffer that is constantly recording. When the camera reaches the end of the memory it records from the beginning of memory, erasing the earliest recorded data. Such technology is often employed with surveillance cameras for long and continuous recording with little or no supervision. However, Vanman does not distinguish or differentiate any data that is of importance. To save data in the buffer, the user of the Vanman device needs to transfer important portions of the buffer wirelessly to a central office or physically to a DVD disc, or else risk having the interesting data be recorded over during loop recording. Such transfers are processor intensive and may not be possible when the central office is out of range or an empty DVD disc is unavailable.

Vanman and all other extrinsic materials identified herein are incorporated by reference in their entirety. Where a definition or use of a term in an incorporated reference is inconsistent or contrary to the definition of that term provided herein, the definition of that term provided herein applies and the definition of that term in the reference does not apply.

EP 1064783 to Mann describes a camera mountable to a pair of eyeglasses that continuously saves recorded images to a circular buffer in a computer on the user's waist. When a user wants to save a piece of recorded video, the user must stop recording and offload the data at another location before the user can record again. Mann also discusses streaming the images directly to a wireless memory that may have a larger capacity; however, this means that the camera does not work in the absence of a wireless connection. U.S. Pat. No. 5,523,799 to Hattori et al. also describes storing data in a memory having an archival portion. However, Hattori fails to address sending data to a remote memory.

Thus, there is still a need for a recording camera that provides better recording and editing functions.

III. SUMMARY OF THE INVENTION

The present invention provides apparatus, systems, and methods in which a surveillance apparatus processes images by (1) continuously recording a stream of imaged data, (2) write protecting segments of the recorded stream, and (3) sending write protected segments from a local memory to a remote memory using a wireless transmitter.

The surveillance apparatus generally has a camera functionally coupled to a local memory with a circular buffer. As used herein, the term "a local memory functionally coupled to the camera" means that the memory that is distanced less than 20 cm from the camera, and is coupled to the camera using entirely physical connectors (e.g., wires, pins, conductive paths, etc.). This contrasts with a "remote memory functionally coupled to the camera", which would be a memory that is distanced from the camera by at least 20 cm, or is coupled to the camera using a wireless connection. The circular buffer is preferably organized into a series of memory segments that loops back on itself and is organized into both available segments and write-protected segments. This allows a recording facility to record the data stream available in portions of the circular buffer while skipping over write-protected matter. Preferably, the local memory is large enough to store at least 5 or 10 minutes of imaged data.

Preferably, the recording facility continuously records the data stream into the circular buffer any time the surveillance apparatus is powered on. As used herein, the term "continuous" with respect to recording a video data stream means that data is recorded at least every half second over a given ten second period. When a signal to record is sent to the surveillance apparatus, a protecting facility designates a segment of the circular buffer to be write-protected to prevent that segment from being overwritten during the next recording loop. Part of the write-protected portion could be a pre-recorded subset that is recorded before the signal is received, while part of the write-protected portion could be a post-recorded subset that is recorded after the signal is received. The pre-recorded subset could be as long as 5 seconds, 10 seconds, 30 seconds, or more. Preferably, various aspects of both the pre-recorded subset and the post-recorded subset can be configured with a user interface. While the write-protected portions could be electronically indexed using a memory heap or a clustered index, the write-protected portions are preferably stored as separate files in the memory. Such files could be stored in physically dis-contiguous parts of the circular buffer. Additionally, the indexing is preferably performed while the recording facility is still recording data into the memory.

The signal to record is preferably automatically triggered by a sensor that detects an image in the camera or a sound by the camera's microphone. For example, the signal to record could be triggered by a human face, an open book, a computer screen, a whistle, a verbal command, a recognized object, or a pattern of knocks. Alternatively, a user interface could allow a human user to manually send the signal to record and could even allow the human user to designate a length of time of the pre-recorded subset or the post-recorded subset. A user could send two signals, one to start recording and another to stop recording, but preferably the user merely sends a signal to start recording for a specified period of time. In an exemplary embodiment, when the specified period of time has almost expired, say, for example, 5 seconds, 10 seconds, or longer, the user could extend the length of specified time by sending another trigger to the surveillance apparatus. For example, the surveillance apparatus could send a warning 10 seconds before it is scheduled to stop recording by vibrating against the user; in response the user could say "don't stop" or merely cough to extend the length of the write-protected portion of memory.

While the surveillance apparatus could be a mounted on a hand-held video camera, the surveillance apparatus is preferably a small device that can be mounted inconspicuously on a person. For example, contemplated surveillance apparatus mounts are a pair of wearable sunglasses or eyeglasses, a lapel pin, a collar button, a hat or visor, a hair pin, or a front of a purse.

Since the surveillance apparatus is typically too small to house a large amount of memory, the surveillance apparatus also preferably has a wireless transmitter that is also functionally connected to the local memory. A sending facility uses the wireless transmitter to transmit write-protected portions of the circular buffer to a remote memory that is not physically connected to the local memory in some way. For example, the wireless transmitter could send write-protected portions of the circular buffer to a mobile phone, or the surveillance apparatus could be plugged into a mobile phone which is then used as a wireless transmitter to forward a write-protected portion to another remote memory. In a preferred embodiment, after a write-protected portion of the circular buffer is transferred to a remote memory, the protecting facility could remove the corresponding portion from protection so that the recording facility could use that portion to record data.

Various objects, features, aspects and advantages of the present invention will become more apparent from the following detailed description of preferred embodiments of the invention, along with the accompanying drawings in which like numerals represent like components.

IV. BRIEF DESCRIPTION OF THE DRAWING

V. DETAILED DESCRIPTION

Figure 1:
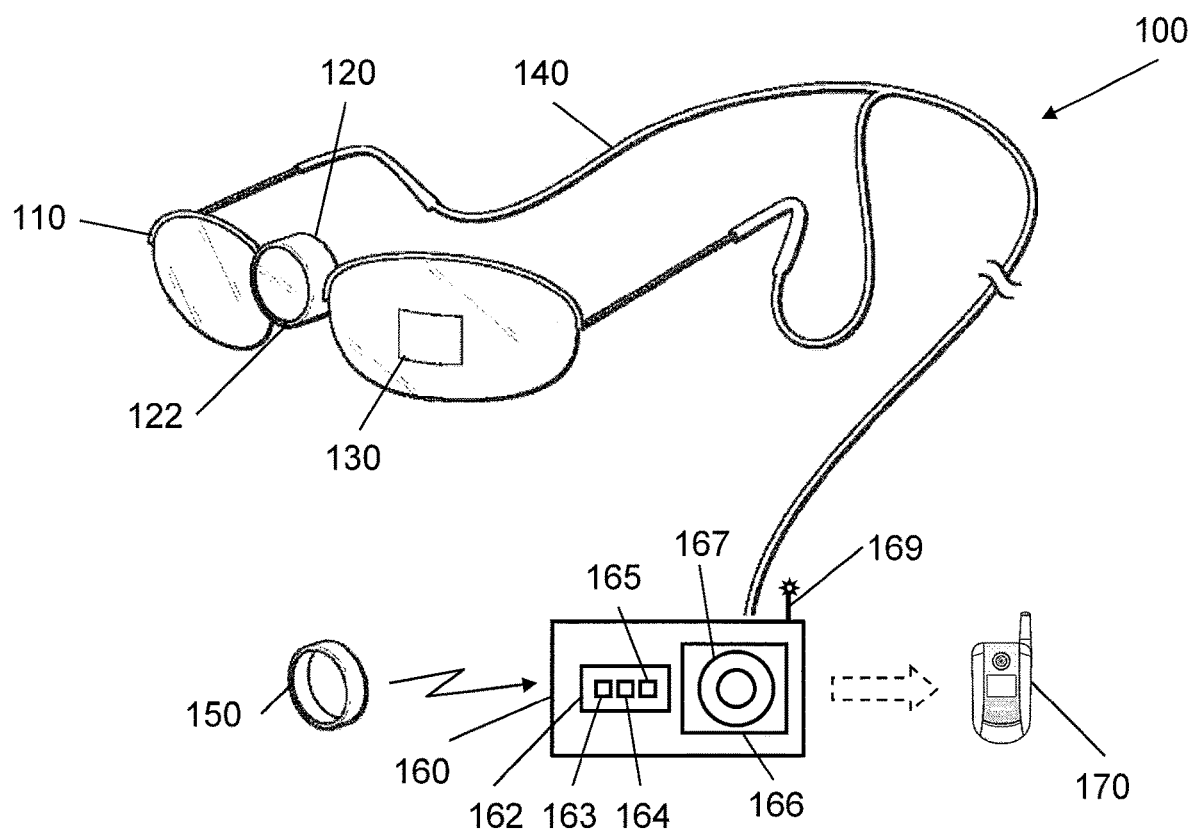
FIG. 1 is a camera mounted on a pair of glasses connected to a circular buffer in a local memory that is controlled by a ring.

In FIG. 1, an example surveillance apparatus 100 generally comprising eyeglasses 110 having a camera 120 mounted at the nose bridge, and an optional viewfinder 130 applied onto one of the lenses. A data and power cord 140 couples the camera 120 to a belt-worn recorder 160, which cooperates with a ring-shaped signaling device 150 and a remote memory 170. Those skilled in the art will appreciate that the term "surveillance" is used herein in its broadest possible sense, to include not only professional or commercial types of surveillance, but also any other type of observation, including for example an ordinary person watching a baseball game or birthday party.

The eyeglasses 110 are used here euphemistically to represent any type of camera mount. In a preferred embodiment, the camera mount is disguised to be a common object worn by a person or lying around a house, but could also be shaped and sized to look like a camera. Contemplated mounts include lapel pins, hair clips, shirt buttons, purses, staplers, desk clocks, tripods, head gear, hand grips, or security camera mounts. As used herein the term "camera" means any device or collection of devices that includes an image capturing component that captures image data, and a converting component that converts the image data into digital data, possibly at least one data stream. An image capturing component could include one or more charge-couple devices (CCD) complimentary metal-oxide-semi-conductors (CMOS), CMOS focal plane arrays (CFP), radiometers, or other manners of image obtaining devices. Camera 120 should be interpreted euphemistically to include all such variants. Likewise, a suitable converting component could include one or more analog-to-digital converters, software codecs, or integrated circuits.

Camera 120 contains an imager lens 122 used to focus images for camera 120. Conventional lenses allow one or more of the following adjustments: aperture (to control the amount of light), zoom (to control the field-of-view), or shutter speed (to capture continuous motion.). In preferred embodiments, these adjustments are automatically controlled by the camcorder electronics, generally to maintain constant exposure onto the imager without the manual adjustment from a user. It is contemplated that the preferred embodiments offer direct user control of all major optical functions. As with most modern digital recorders and camcorders, an analog-to-digital (ADC) converter is used to digitize the analog imager waveform output into a discrete digital-video signal. Thus, the recorder can be used to record analog or digital formats.

Viewfinder image lens 130 is calibrated to have the same field of view as camera 120. Preferably, viewfinder image lens 130 is embedded in between the two glass lenses of eyeglasses 110. Preferably viewfinder image lens 130 is a zoom lens with preferred standard zoom ration of 3× in or out of the focal length of the camera. A more sophisticated viewfinder image lens 130 is contemplated to have a greater zoom range and also has nighttime vision or is able to render images under different light conditions. Within the lenses, viewfinder image lens 130 is outlined by tinted area or graticle and the outline graticle is embedded with glowing fiber optic filament. Eye-glasses are made preferably from opaque, translucent, or possibly photo gray-type tint of glasses. Alternatively, glasses change color slightly when energized.

Where the camera is a hand-held camera and is not embedded in a pair of eyeglasses, viewfinder image lens 130 can be permanently fixed to camera 120, or it can be interchangeable with lenses of different focal lengths and other properties depending on the need and circumstances of use.

Recorder 160 is any recording device that records video and/or audio/video data, including conventional recorders. Recorder 160 preferably includes a processor 162 with software or hardware that accomplishes the functions described herein, or one or more physical memories that are collectively referred to herein as memory 166. Typically, the recorder or the camera converts analog images into a digital format to be stored in the memory, or also preferably records both audio and video input analog signals from the camera to the memory. Those skilled in the art will also appreciate that the concepts described herein with respect to video and/or audio/video data can be applied to recordation of purely audio, or in fact any other type of data stream; this specification should be interpreted as expressly including such application. A wearer could clip recorder 160 as a belt clip or another compact device. Contemplated recorders include MP3 players, purses, or buttons. It is also contemplated that recorder 160 could also comprise a cell or mobile phone having a suitable recorder application installed that is configured to communicate with the other components of apparatus 100.

Although not expressly shown, recorder 160 also includes an appropriate power supply or connection, supporting electronics, or a display or other interface. The power source can vary considerably. For example, in embodiments where the recorded is relatively large, a suitable power source can include a rechargeable battery. On the other hand, when the recorder is relatively small, an appropriate power source can include an external power source (e.g., transformer for wall outlet or cigarette lighter adapter). Whether embodied in control buttons or in some other manner, it is also contemplated that recorder can include some sort of security control requiring a password and some sort of automatic turnoff feature that activates after a certain amount of inactivity. Authentication or authorization of user access provides for ensuring a proper user of apparatus 100 retains desired control. For example, once a user is authenticated, the user can control indexing, editing, transmitting, or adjusting content data in memory.

Recorder 160 would typically record images in digital format, but analog or combination formats are also contemplated. Preferably, the recorder's electronics are preferably all on a unitary printed circuit board with different functions, or facilities, encoded on a programmable chip or disk. For example, a recording facility 163 could record the data stream from camera 120 to local memory 166, a protecting facility 164 could protect segments (not shown) of recorded data on memory 166, or a sending facility 165 could transmit protected segments (not shown) of recorded data to remote memory 170. While the different facilities are preferably part of a single hardware or software program, the facilities could be split into different components as necessary. Other facilities could be installed, for example a facility that allows editing of the received image data or protected data. It is contemplated that such facilities could be purchased through or installed on a cell phone, possibly through an on-line application store.

The contemplated memory could vary depending on the particular configuration of the recorder. Particularly suitable memories include commercially available micro hard drives with a 1-inch disc (which can preferably have a capacity of more than 1 GB), flash memory cards with a capacity of up to 128 MB and more, or other transient and/or permanent memory units. Likewise, suitable memory can also include SDRAM, MRAM, racetrack memory, SIMM, DIMM, etc. with a capacity of at least 32 MB, more preferably at least 64 MB, or most preferably above 128 MB. In preferred embodiments, memory 166 is a SDRAM capable of storing at least 1000 frames of data. Once received by memory 166, frames are preferably compressed by employing conventional compression rates and methods to achieve at least a 50:1 ratio.

In preferred embodiments, image data received by recorder 160 is stored in a circular buffer 167 on memory 166. Preferably, all of the free space in memory 166 is used to create circular buffer 167, however, multiple circular buffers could be created in the memory where there exist multiple cameras connected to a single recorder. Once the recorder is turned on, image data is continuously stored in circular buffer 167 for access. If no record or protect button is pushed, the recorder will loop back and store the image data for a said length of time. Recording, book-marking and protecting are used synonymously herein. Recording, book-marking and protecting means that a portion of the imaged data is write-protected upon an activation of a signal by a user and can not then be overwritten unless the write-protection is later removed. Consequently, protected data cannot be overwritten by newly stored imaged data in the circular buffer.

The circular buffer is preferably large enough to store at least 3 minutes of data, more preferably 5 minutes and most preferred 10 minutes of data. However, it is contemplated that depending on the size and capacity of the device, any length longer or shorter is possible. It is preferred when the recorder is turned on the entire circular buffer is treated and stored as a single file. Thus, if no recording is protected or bookmarked, then the entire file will be erased and the recording will start at the beginning of the circular buffer.

Figure 2A:
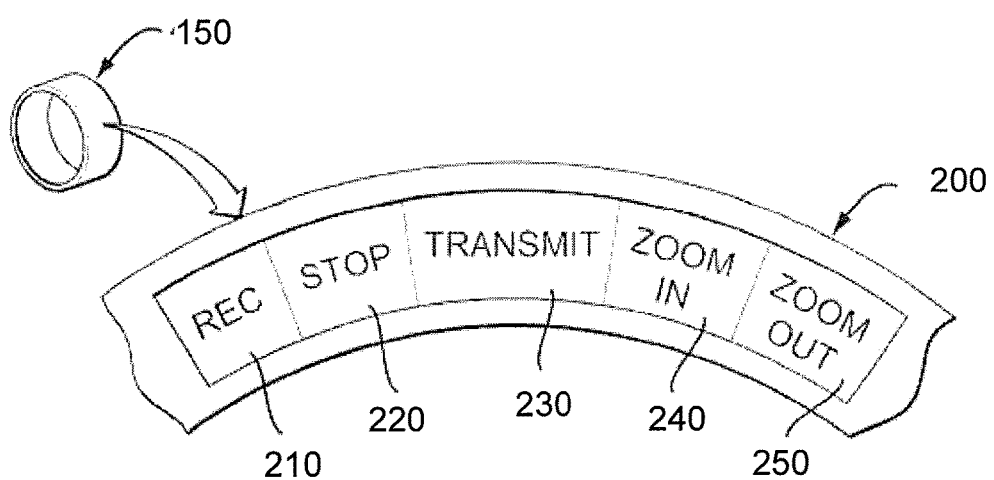
FIGS. 2A and 2B show user interface buttons for the ring of FIG. 1.
Figure 2B:
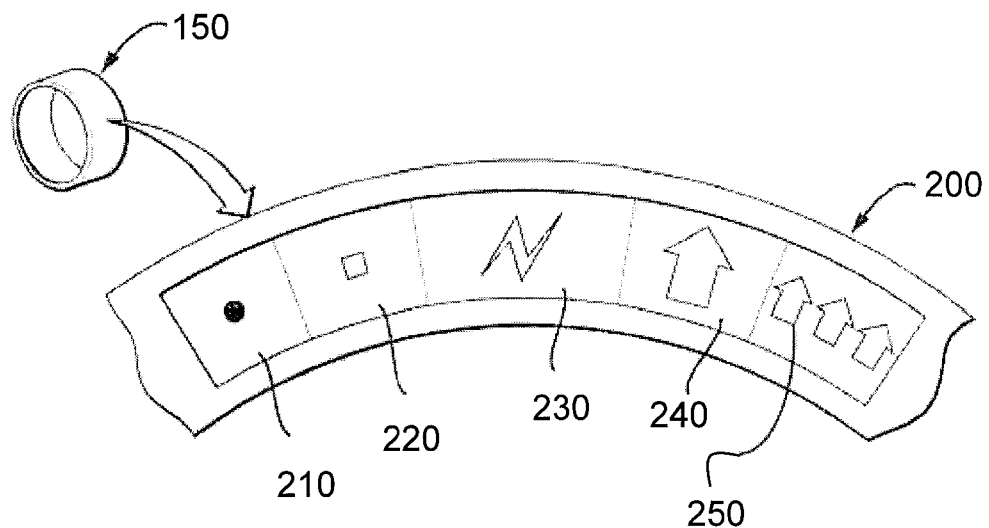

Signaling device 150 is shown in the figure as a ring that communicates wirelessly (e.g., BlueTooth, Skinplex, wireless USB, 802.11, 802.15, UWB, Z-Wave, IrDa, Zigbee, etc.) with the recorder, possibly as part of a personal area network (PAN). The ring can have any suitable interface, shown in FIGS. 2A and 2B, including for example buttons on its outer periphery, or a sensor along its inner edge. In FIG. 2A, ring 150 has user interface 200, with a start signal button 210, a stop signal button 220, a transmit button 230, a zoom in button 240, or a zoom out button 250. Alternatively, the buttons could have decorative symbols in lieu of words of function as shown in FIG. 2B, or could even have arbitrary symbols surrounding the entirety of signaling device 150. These buttons allow a user to manipulate and control image data and to generate protected data.

In an alternative embodiment, turning the ring in one direction might produce a start signal, and continuing to turn the ring in that direction might extend backwards the time period that is protected. Where a default time period for storing pre-start signal data is used, extending the time can be considered overriding the default. Similarly, turning the ring in the opposite direction might produce a stop signal, and where a default time period for storing post-start signal data is used, extending the time can be considered overriding that default. Electronics for such a ring or other control device are readily available, and for example are similar to those used in key fobs. Indeed, signaling device 150 should be interpreted euphemistically to include key fob type device.

It is contemplated that the signaling device could be integrated into other items as an accessory and that is wearable on an individual, for example a lapel pin or a pen within a pocked protector. It is also contemplated that the switch could be portable or can be hidden or attached to other devices such as a vehicle, furniture, etc. The signal could also be generated in non-tactile ways, for example by an audio command or whistle, or by an automatic sensor. Preferably, the user could configure the audio signal to match only his/her voice.

At any moment, the user can signal recorder 160 to place a "bookmark" in the recording. This signal can be sent by pressing a button that will then transmit a signal through wires 140 that attach to the glasses then to the recorder. The wires 140 could be fiber optic wires that are small and thin to avoid detection. In an exemplary embodiment, the user could control the entire system using signaling device 150, for example by turning the camera on and off, recording a portion of image data, stop the recording, zooming in and out of image data; or transmitting protected data into the remote memory 170.

While remote memory 170 is shown in the figure as a mobile or cell phone, remote memory 170 should be interpreted euphemistically to include any memory that is not connected to surveillance apparatus 100, for example, a DVD writer, a wireless network attached storage (NAS) device, a wireless storage area network (SAN) device, a home computer, or even a second surveillance apparatus. Preferably, sending facility 165 sends protected segments of circular buffer 167 wirelessly to remote memory 170 whenever remote memory 170 is within range of wireless transceiver 169, possibly as part of a PAN using one or more wireless communication technologies (e.g., BlueTooth, Skinplex, wireless USB, 802.11, 802.15, UWB, Z-Wave, IrDa, Zigbee, etc.). However, sending facility 165 could also respond to manual commands, for example through a button on signaling device 150, recorder 160, or the mobile phone itself. In an alternative embodiment, the mobile phone does not act as a remote memory depository, and instead forwards the protected segment to a remote memory via a mobile internet or wi-fi connection. Preferably, once protected data is transferred to a remote memory, the protected memory areas then will go back to become free memory areas that are available for further loop recording.

Write-protected data could be sent to the remote memory by an image sensor that outputs data directly in "block" format typically converted with a raster-to-block converter. Further compression could be used before transmitting the data if wireless bandwidth is an issue. Either DCT or wavelet transformed data on native sensor formats could be used. The data is preferably transmitted via the Internet, but could also be transmitted using radio waves, a pager, a two-way pager, a physical cable, email, text message, picture message, or any other suitable communication mechanism.

Figure 3:
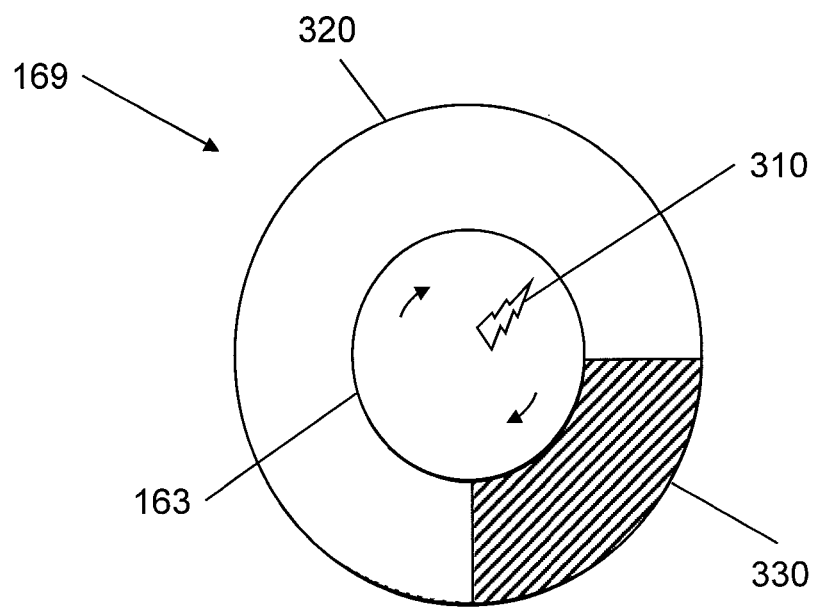
FIG. 3 shows a diagram representation of the circular buffer of FIG. 1.

FIG. 3 shows a diagram representation of circular buffer 167 in memory 166, with unprotected segment 320 and write-protected segment 330. Write-protected segment 330 is characterized as a predefined portion of the recording data. The recording facility 163 continuously records the data stream 310 into circular buffer 167. The recording facility 163 records over unprotected segment 320 of circular buffer 167, while skipping over protected segments 330 of circular buffer 167. It is contemplated that the portion of the circular buffer that is marked as write-protected data cannot be overwritten once the recorder loops back to the beginning of the media.

FIGS. 4A-4H show an alternative diagram representation of a circular buffer 300 as it is being used.

Figure 4A:
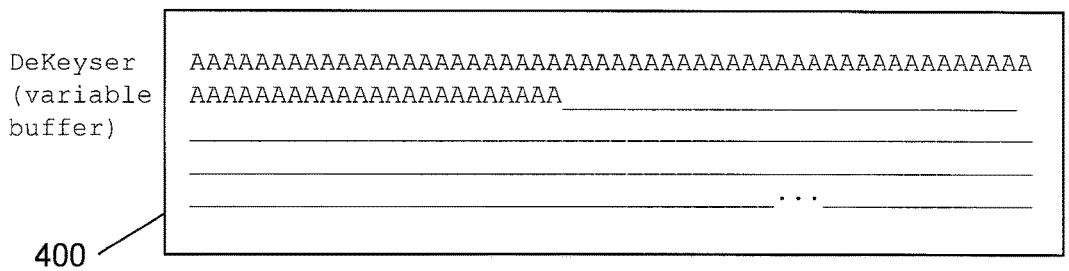
FIG. 4A-4H show representations of the circular buffer of FIG. 1 while the surveillance apparatus is in use.

In FIG. 4A the recording facility (not shown) records data stream "A" into circular buffer 400. The " " character is used to designate blank memory, or unprotected memory that can be overwritten. The ellipsis " . . . " is used to show that the memory can be very large relative to the number of positions shown in the figure. It is contemplated, for example, that memory 400 can be up to several hundred megabytes, 1 GB, 2 GB, 4 GB, 8 GB, or even more. Such memory is preferably of a flash type, non-volatile RAM, preferably in the form of a standard flash memory card. In a preferred embodiment, circular buffer 400 comprises a logical representation of a physical memory area. Buffer 400 can be configured to store data in the physical memory by taking into account wear-leveling across the physical memory.

Figure 4B:
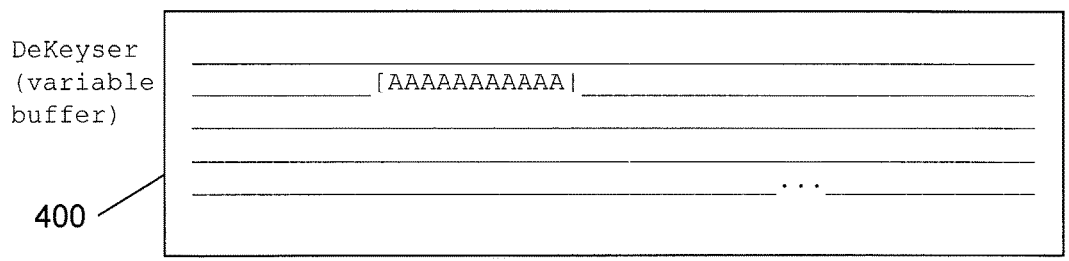

In FIG. 4B the protecting facility (not shown) has protected a recent period of data stream "A" as a function of a start signal, shown by the character "[". The start signal can be triggered in any suitable manner, including for example manual operation of a trigger or a switch by a user. For example, the ring of FIG. 1 could be used as a switch, or any other wearable accessory could have a switch integrated into it. In other examples, start signals can be triggered by detection of a particular circumstance by a motion, sound or other sensor. In an exemplary system, software can operate upon content in the data stream, such as by monitoring an entrance to a building using a data stream received from one or more cameras, and could then send a start signal when the image shows a person loitering in a certain area of the screen.

The "[" character is used to designate the start of protected memory. Concomitantly, the portion of the data stream prior to the protected portion has once again been marked "_" to show that it is unprotected. In protecting recent data, the system can protect a default historical time period before the start signal is sent and protect a default period after the start signal is sent (such as 30 seconds, 2 minutes, etc). All suitable defaults are contemplated. Alternatively, the historical time period being protected could be altered in some manner, such as by software or by a user operating a history button. For example, if a user hits a start button, the system might default to protecting the last 30 seconds and the next 60 seconds; or it might protect the last 15 seconds and the next 2 minutes.

Preferably, before the protecting facility stops protecting data, the system sends a signal to the user that the system is about to stop write-protecting data. For example, the system could send an audio chirp signal, or in the case of a pair of eyeglasses, a portion of the glasses could slightly vibrate to signal that the system will stop recording in 10 seconds. If the user wishes to protect an additional 60 second time period, the user could hit a "more time" button. In this manner a user could protect a 5 or 10 minute period, or an even much longer portion of a data stream prior to a start signal. Indeed, if memory 400 is interpreted as a multi gigabyte flash memory, it is entirely possible that one could back up sufficiently to protect an hour or more of such a data stream.

Figure 4C:
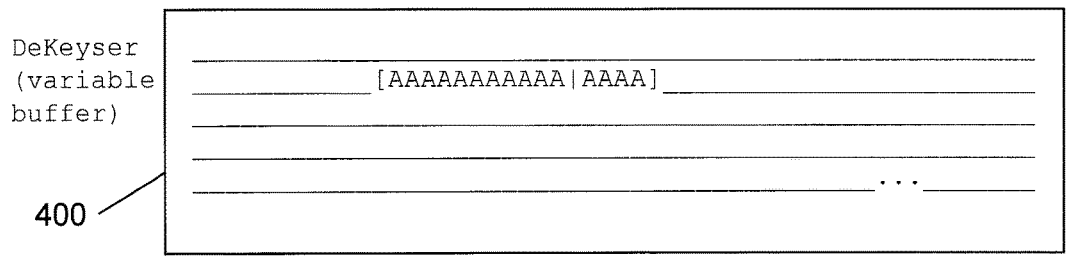

In FIG. 4C the protecting facility has received a "stop" signal some time after receiving the start signal, thereby lengthening the protected portion of the "A" data stream. The stop signal is shown as character "]" and could be automatically generated from software or hardware as a function of a default time after the start signal, or could be manually sent by the user of the system. All suitable defaults are contemplated, including for example a 30 second or 1 minute time period. Stop signals could also be generated in a variable fashion, again as a function of software or hardware, through action of a user, or in any other suitable manner. Thus, a user can well operate a start button or other switch, a more time switch, and a stop switch, which could have the same or different interfaces. It is also contemplated that the system could recognize a user's verbal commands for these functions.

Just as the system can utilize a default pre-start signal period of time for which a portion of the data stream is stored unless overridden in some manner, contemplated systems can utilize a default post-start signal period of time for which a portion of the data stream is stored unless overridden in some manner. Using defaults for both pre-start and post-start signal periods allows a system to operate with an extremely high level of user convenience. For example, in one contemplated class of systems using such defaults, a user could operate a single button, ring or other interface to initiate a start signal, and the system could respond by automatically storing a default 60 second portion of a data stream prior to the signal, as well as a default 30 time period of the data stream after the signal. And all of that could be accomplished with a single operation of the button. An interface could also be provided to allow the user to alter the length of time for the pre-recorded portion and the length of time for the post-recorded portion. As should be apparent from the description above, all reasonable the default time periods are contemplated.

Figure 4D:
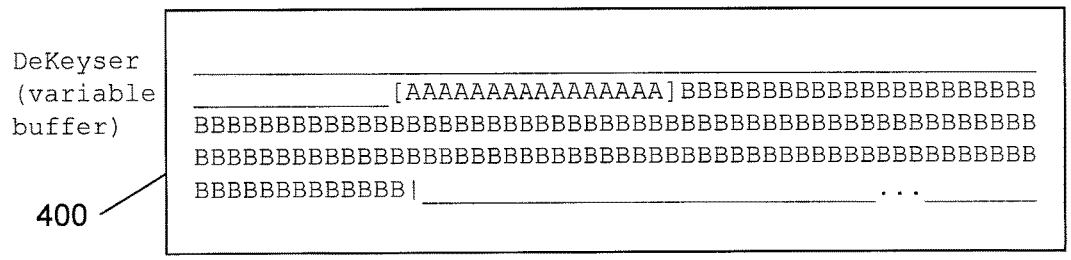
Figure 4E:
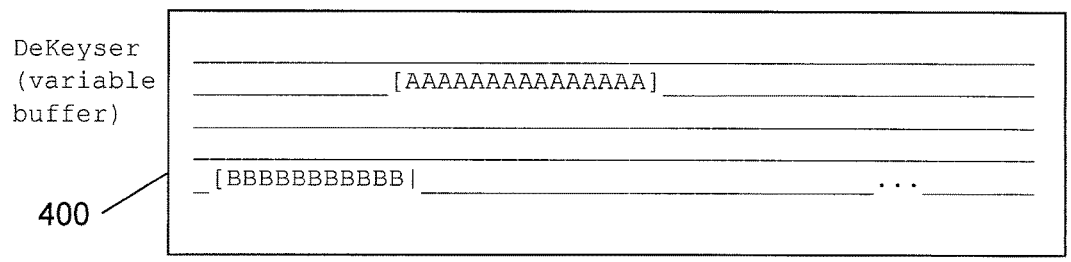

In FIG. 4D, the system has finished protecting the desired portion of the "A" data stream, and the recording facility continues to store a "B" data stream into circular buffer 400. Of course, the "B" data stream can be contiguous with the "A" data stream, so that differentiation of "A" and "B" streams is merely an artifact of how the data is being stored. For example, if a system included an eyeglasses camera being used at baseball game, the wearer might watch the game for an hour or more without anything of interest happening. During all that time the system would record image frames from the camera, looping in memory if the memory had remaining capacity for less than an hour of images. When finally the wearer sees an interesting play that he wants to protect, he operates a start button, or perhaps a more time button to protect the previous minute of play. Once the interesting action has completed, he operates a stop button, which thereby causes the system to complete protecting the entire "A" period of interest. But the wearer continues watching the game, and the subsequent images, continuous with the "A" images, would be considered "B" images. In some embodiments, the wearer can select to have more of previously recorded data to be protected. For example, once the wearer operates the start button, the wearer could also indicates that additional previously recorded data should be protected (e.g., past 10 seconds, 30 seconds, one minute, five minutes, etc.) while new image data is being stored and protected.

Figure 4F:
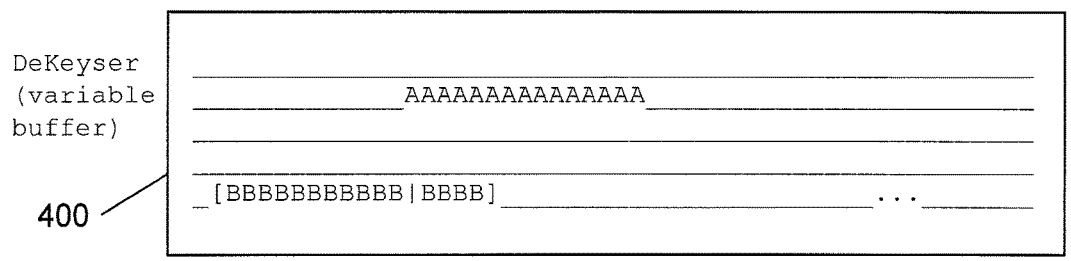

In FIG. 4E the system has again received a start signal, and has again protected a fixed or variable historical time period. In FIG. 4F the system has received a stop signal, and has protected the entire desired portion of the "B" data stream.

Figure 4G:
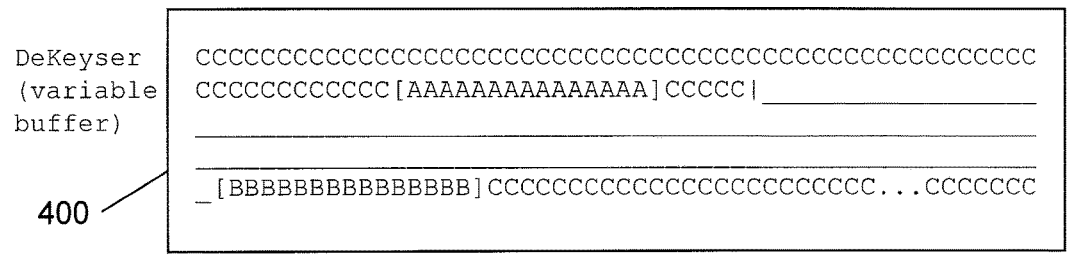
Figure 4H:
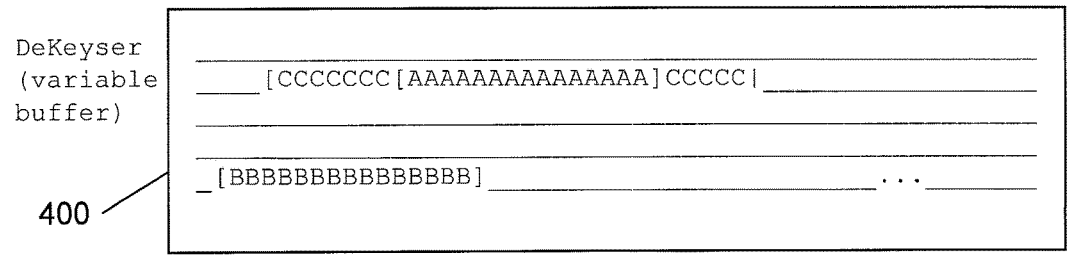

In FIG. 4G the system has continued to record data, which is now depicted as data stream "C" because it follows data stream "B". This figure is particularly significant in that recordation of the "C" data stream skips over the protected portion of the "A" data stream. In FIG. 4H the system received another start signal, and has protected a desired portion of the "C" data stream that straddles the protected "A" stream. As shown, the C data stream is saved as a physically dis-contiguous file.

In a preferred embodiment, segments of recorded data are "write-protected" by being indexed in an electronic index. This scheme allows the system to protect previously recorded areas of memory without interrupting any concurrent recording, and further allows the system to easily locate such protected segments for play-back or offloading to a remote memory. Additionally, this allows the system to keep track of multiple fragments dis-contiguous fragments of a single write-protected segment. The electronic index is preferably a hash table or a clustered index, but other methods of addressing memory are also suitable.

Protected data can be copied to a memory separate from the circular buffer, for example in a separate file within a local memory. Multiple segments of protected data could thus be stored as a series of protected files in a directory structure. In an exemplary embodiment, as soon as the data is designated in the index as being protected, the recorder searches for a remote memory in range, and immediately copies the protected data from the circular buffer to the remote memory. Once confirmation of copying is received, the index can be updated to identify the previously protected portion of the circular buffer as being non-protected.

As previously discussed, a sending facility uses a wireless transmitter to transmit write-protected data to a remote memory. One should note that there are many additional aspects of the inventive subject matter surrounding transmitting the data to the remote memory. In some embodiments a surveillance apparatus participates in a PAN with other components including the remote memory. In such embodiments the apparatus can discover other components of the system, including the remote memory or signaling devices, by sending message over one or more suitable protocols (e.g., BlueTooth, Skinplex, wireless USB, 802.11, 802.15, 802.16, UWB, Z-Wave, IrDA, Zigbee, etc.). Component discovery can be via a push where the apparatus sends a discovery message over a protocol to remote components or via a pull where the remote components send a discovery message to the apparatus. The components of the system can respond with a discovery response message. Preferred discovery or discovery response messages comprise characteristics of the various responding components including buffer size, read/write rates, authentication, authorized command sets, or other parameters. For example, the surveillance apparatus could send a discovery message out to discover any suitable remote memories in the PAN where the message is encapsulated in a BlueTooth protocol packet. A cell phone could respond by allocating a memory area to operate as a remote memory and by sending a discovery response message back to the apparatus describing the amount of memory available. Such an approach provides for creating surveillance apparatus products that are able to operate across multiple cell phone platforms by allowing a cell phone user to download or install an application, or possibly a driver for their specific cell phone model, capable of being discovered and operating with the apparatus.

Another aspect of transmitting data to the remote memory includes authenticating the various components with respect to access or to control remote memory. In some embodiments, the surveillance apparatus, or even the signaling facility, can be authenticated with the remote memory via a suitable token exchange (e.g., passwords, public-private key, handshakes, etc.). For example, a remote memory could be bound to a specific apparatus via a secret key, possibly having a UUID or GUID. Furthermore, the components of the system can be authorized to access various levels of functionality based on their authentication. Some apparatus could have read only access, while other could have write access, or while still others have editing capabilities.

Yet another aspect of transmitting data to the remote memory includes the remote memory providing access to multiple surveillance apparatus. For example, a single remote memory, possibly a cell phone, could be in close proximity (e.g., physically local within 100 meters or logically local within the same network) to two or more apparatus. The remote memory can provide image storage as necessary to each apparatus, assuming appropriate authentication or permissions. In addition, it is contemplated that a single apparatus could have more than one camera where each camera has its data transmitted to the remote memory collectively via the apparatus or even individually, possibly where each camera has access to different remote memories, or different areas (e.g., files) in the same remote memory.

One should also note that a surveillance apparatus can employ multiple wireless protocols to interact with the various components. For example, the apparatus's signaling device could connect to a recorded via Zigbee or Skiplex protocols while the apparatus could connect to the remote memory via IEEE 802.16.

One purpose of the invention is to allow secret recording by a user. The user can integrate the recorder as part of his/her wardrobe or even as clothing accessories, such as a pin or a hat. Preferably, recorder will record video and audio as seen from the wearer's point of view without requiring the wearer to exert any special effort to operate the recorder. The recorder operates for extended periods of time while remaining unobtrusive both to the wearer/operator and to the subject(s) being recorded.

In order for the device to be practical, physical size and weight are of primary importance. The recorder portion must be small and lightweight enough to be unobtrusive. Preferably, the size of the recorder is two inches by three inches by one-half inch and six ounces in weight including battery. The camera or imaging component must be small and lightweight enough to be mounted on a pair of eyeglasses without conspicuous bulk or uncomfortable weight on the order of one-quarter inch by one-quarter inch by one inch or smaller and weighing one ounce or less. Further, the imaging component must be capable of sufficient resolution that the image quality of the resulting recording is comparable with existing consumer camcorder products. Preferred resolutions are at least 640×480 pixels. However, more preferred resolutions include high definition quality resolutions (e.g., 720p, 1080i, 1080p, 2160p, etc.).

Since the recorder will be worn on the body and the wearer can move actively about when the device is in operation, it is important that the entire device be mechanically rugged and that all components, particularly the storage media, be impervious to the shocks resulting from such body movement. The device is also likely to be exposed to environmental stresses such as dust and moisture so the components and packaging must accommodate this exposure. Solid state media such as compact flash memory is particularly suitable as the recorder's storage media since it meets these requirements.

Alternatively, the recorder device can be mounted on vehicles, planes or any other objects for ease of use. It is contemplated that the present invention can be used in military or field intelligence operations.

The advantages of the disclosed techniques are clear. A user of the inventive subject matter can capture image data while also participating with others in an event without being trapped behind a recording device. Furthermore, the user's hands can remain substantially free while recording.

Thus, specific embodiments and applications of recording images to a circular buffer in a local memory and transmitting it wirelessly to a remote memory have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A recording system for saving a sequence of clips comprising:
    a pair of eyeglasses having a sensor that captures sensor data;
    a first memory communicatively coupled with the sensor; and
    a computer processor configured to:
        record the sensor data in the first memory;
        in response to a first trigger signal, designate for saving a first portion of the sensor data that was captured prior to occurrence of the first trigger signal, wherein the portion of the sensor data occupies a portion of the first memory that is less than the entirety of the first memory and corresponds to a length of time prior to the first trigger signal;
        contiguously continuing to record the sensor data in the first memory while the first portion of the sensor data is designated for saving;
        in response to a subsequent second trigger signal, designate for saving a second portion where in the second portion occupies less than the remaining entirety of the first memory not designated for saving and corresponds to a length of time prior to the second trigger signal; and
        automatically overwrite portions of the sensor data that were recorded in the first memory that were not designated for saving.

2. The recording system of claim 1, where in the computer processor is further configured to copy the first designated portion to a second memory.

3. The recording system of claim 2, wherein the second memory comprises a different part of the first memory.

4. The recording system of claim 2, wherein the first designated portion is stored in the second memory using compression.

5. The recording system of claim 2, wherein the computer processor is further configured to copy, to the second memory, another portion of the sensor data that was captured after occurrence of the first trigger signal.

6. The recording system of claim 2, wherein the computer processor is further configured to copy, to the second memory, another portion the sensor data that was captured during occurrence of the first trigger signal.

7. The recording system of claim 1, further including with the first designated portion, another portion of the sensor data that was captured after occurrence of the first trigger signal.

8. The recording system of claim 1, wherein the computer processor is further configured to transmit, via a wireless transmitter, the first designated portion to a remote memory.

9. The recording system of claim 1, wherein the sensor data comprises at least one of the following: image data and video data.

10. The recording system of claim 1, wherein the first memory comprises a circular buffer.

11. The recording system of claim 1, wherein the first designated portion is stored using time compression.

12. The recording system of claim 1, wherein the first designated portion is stored using frame compression.

13. The recording system of claim 1, further comprising a camera that includes the sensor interface, the first memory, and the computer processor.

14. The recording system of claim 13, wherein the camera comprises a security camera.

15. The recording system of claim 1, further comprising a cell phone including the sensor interface, the first memory, and the computer processor.

16. The recording system of claim 1, further comprising a personal area network coupled with the computer processor and including at least two of the following: the sensor interface, the first memory, and the computer processor.

17. The recording system of claim 1, wherein the first memory is configured to record the first designated portion of the sensor data in a file.

18. The recording system of claim 1, wherein the first memory is configured to record the first designated portion of the sensor data in a single file.

19. The recording system of claim 1, wherein the first trigger signal represents detection of at least one of the following: a motion, a sound, an image, content in a data stream, a pattern in the sensor data, a person, a human face, a computer screen, an event, a verbal command, operation of switch, and operation of a button.

20. The recording system of claim 1, wherein the computer processor is further configured to write-protect the first designated portion as a write-protected portion in the first memory.

21. The recording system of claim 20, wherein the computer processor is further configured to free the write-protected portion following a transmission of the first designated portion.

22. The recording system of claim 1, wherein the computer processor is further configured to index in the first memory the first designated portion.

23. The recording system of claim 1, wherein the computer processor is further configured to index the first designated portion while the recording facility is still recording the sensor data into the first memory.

24. The recording system of claim 1, wherein the computer processor is configured to record the sensor data continuously, from before the first trigger signal, through a pre-designated time period, and after the pre-designated time period.

25. The recording system of claim 1, wherein the first portion of the sensor data also corresponds to a pre-determined length of time after the trigger signal.

* * * * *

UNITED STATES PATENT AND TRADEMARK OFFICE
CERTIFICATE OF CORRECTION

Page 1 of 1

PATENT NO. : 10,523,901 B2
APPLICATION NO. : 15/875828
DATED : December 31, 2019
INVENTOR(S) : Paul DeKeyser It is certified that error appears in the above-identified patent and that said Letters Patent is hereby corrected as shown below:

On the Title Page

Page 2, item [63], replace:
"application No. 12/560,584, filed on Sep. 16, 2009, now Pat. No. 8,692,882, which is a continuation-in-part of application No. 12/268,286, filed on Nov. 10, 2008"

With:
--application No. 12/560,584, filed on Sep. 16, 2009, now Pat. No. 8,692,882, which is a continuation of application No. 12/268,286, filed on Nov. 10, 2008--

Page 2, item [60], insert:
--Provisional Application 60/824,097 filed on August 31, 2006.--

In the Specification

Column 1, Lines 16-20, replace:
"This application and Ser. No. 12/268,286 are also continuations-in-part of U.S. patent application Ser. No. 11/846,217, filed Aug. 28, 2007, which claims the benefit of U.S. provisional patent 60/824,095, filed Aug. 31, 2006."

With:
--Application Ser. No. 12/268,286 is also a continuation-in-part of U.S. patent application Ser. No. 11/846,217, filed Aug. 28, 2007, which claims the benefit of U.S. provisional patent 60/824,095, filed Aug. 31, 2006.--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*